(12) United States Patent
Liljeroos et al.

(10) Patent No.: US 11,287,881 B2
(45) Date of Patent: Mar. 29, 2022

(54) PRESENTING IMAGES ON A DISPLAY DEVICE

(71) Applicant: Nokia Technologies Oy, Espoo (FI)

(72) Inventors: Ari-Pekka Liljeroos, Pirkkala (FI); Katriina Petäinen, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/982,825

(22) PCT Filed: Mar. 27, 2019

(86) PCT No.: PCT/EP2019/057722
§ 371 (c)(1),
(2) Date: Sep. 21, 2020

(87) PCT Pub. No.: WO2019/185716
PCT Pub. Date: Oct. 3, 2019

(65) Prior Publication Data
US 2021/0055791 A1    Feb. 25, 2021

(30) Foreign Application Priority Data

Mar. 27, 2018   (EP) .................................. 18164237

(51) Int. Cl.
*G06F 3/0485*   (2013.01)
*G06F 3/01*     (2006.01)
(Continued)

(52) U.S. Cl.
CPC ............ *G06F 3/013* (2013.01); *G06F 3/0485* (2013.01); *G06F 3/04815* (2013.01); *G06T 19/006* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 2011/0175932 A1 | 7/2011 | Yu et al. | |
| 2012/0105486 A1* | 5/2012 | Lankford | G06F 3/0481 345/661 |

(Continued)

FOREIGN PATENT DOCUMENTS

| | | |
|---|---|---|
| EP | 2774353 A1 | 9/2014 |
| WO | 2013/066334 A1 | 5/2013 |
| WO | 2018/002423 A1 | 1/2018 |

OTHER PUBLICATIONS

"Automatically Opening a Document at a Specific Zoom Setting", tips.Net, Retrieved on Sep. 21, 2020, Webpage available at: https://wordribbon.tips.net/T011024_Automatically_Opening_a_Document_at_a_Specific_Zoom_Setting.html.

(Continued)

*Primary Examiner* — Xuyang Xia
(74) *Attorney, Agent, or Firm* — Alston & Bird LLP

(57) ABSTRACT

An apparatus, method and computer readable medium are described, including: presenting a current image on a display, the current image having a current zoom level directed towards a current object of interest; determining whether a user's gaze is directed beyond the current object of interest to a new object of interest and, if so, panning or zooming to the new object of interest and making the new object of interest the current object of interest; and determining whether a user's gaze is directed beyond the current object of interest but not to a new object of interest and, if so, zooming to default zoom level in which there is no current object of interest.

11 Claims, 7 Drawing Sheets

(51) Int. Cl.
*G06F 3/04815* (2022.01)
*G06T 19/00* (2011.01)

(56) References Cited

U.S. PATENT DOCUMENTS

| | | | | |
|---|---|---|---|---|
| 2013/0050432 | A1* | 2/2013 | Perez | G06F 3/017 |
| | | | | 348/47 |
| 2015/0077381 | A1 | 3/2015 | Park et al. | |
| 2015/0268822 | A1* | 9/2015 | Waggoner | G06F 3/167 |
| | | | | 715/722 |
| 2016/0300388 | A1* | 10/2016 | Stafford | A63F 13/211 |
| 2017/0323158 | A1* | 11/2017 | Gordon | G06Q 30/06 |
| 2017/0336865 | A1* | 11/2017 | Meyer | G06F 3/013 |

OTHER PUBLICATIONS

Extended European Search Report received for corresponding European Patent Application No. 18164237.2, dated Oct. 5, 2018, 9 pages.

International Search Report and Written Opinion received for corresponding Patent Cooperation Treaty Application No. PCT/EP2019/057722, dated May 27, 2019, 13 pages.

\* cited by examiner

PRESENTING IMAGES ON A DISPLAY DEVICE

RELATED APPLICATION

This application claims priority to PCT Application No. PCT/EP2019/057722, filed on Mar. 27, 2019, which claims priority to European Application No. 18164237.2, filed on Mar. 27, 2018, each of which is incorporated herein by reference in its entirety.

FIELD

The present specification relates to presenting images on a display.

BACKGROUND

Virtual reality (VR) is a rapidly developing area of technology in which video content is provided to a VR display system. As is known, a VR display system may be provided with a live or stored feed from a video content source, the feed representing a VR space or world for immersive output through the display system. In some embodiments, audio is provided, which may be spatial audio. A VR headset may be configured to provide VR video and audio content to the user, e.g. through the use of a pair of video screens and headphones incorporated within the headset.

Mixed reality (MR) is an area of technology in which real and virtual worlds are combined such that physical and digital objects co-exist and interact in real time.

Augmented reality (AR) refers to a real-world view that is augmented by computer-generated sensory input. In the context of the present specification, the term mixed reality is intended to encompass augmented reality.

Immersive content may be provided, for example, in virtual reality, augmented reality or mixed reality scenes. There remains a need for controlling the display of objects within such scenes. For example, there remains a need for providing simple and/or intuitive mechanisms for controlling the display of content, such as virtual reality, mixed reality and augmented reality content.

SUMMARY

In a first aspect, this specification describes an apparatus comprising means for: presenting a current image on a display, the current image having a current zoom level directed towards a current object of interest; determining whether a user's gaze is directed beyond the current object of interest to a new object of interest and, if so, panning or zooming to the new object of interest and making the new object of interest the current object of interest; and determining whether a user's gaze is directed beyond the current object of interest but not to a new object of interest and, if so, zooming to default zoom level in which there is no current object of interest.

The means for determining whether the user's gaze is directed beyond the current object of interest may include determining whether the user's gaze has been beyond of the current object of interest for more than a gaze duration threshold.

The apparatus may further comprise: means for determining whether the new object of interest is similar to the current object of interest, wherein the apparatus further comprises: means for panning to the new object of interest if the new object of interest is determined to be similar to the current object of interest; and/or means for zooming to the new object of interest if the new object of interest is determined to not be similar to the current object of interest.

The apparatus may further comprise: means for determining whether a difference in size between the current and new objects of interest is below a threshold and, if so, determining that the new object of interest is similar to the current object of interest; and/or means for identifying a category of said current and new objects of interest and determining whether said categories are the same and, if so, determining that the new object of interest is similar to the current object of interest.

The apparatus may further comprise: means for determining, in the event that there is no current object of interest, whether a user's gaze is directed towards an object of interest and, if so, presenting an initial image on the display, the initial image having a first zoom level directed towards the said object of interest.

The current image may be a video image and/or a still image.

The display may be a virtual reality, mixed reality or augmented reality display.

The said means may comprise at least one processor and at least one memory including computer program code, the at least one memory and computer program code configured to, with the at least one processor, cause the performance of the apparatus.

In a second aspect, this specification describes a method comprising: presenting a current image on a display, the current image having a current zoom level directed towards a current object of interest; determining whether a user's gaze is directed beyond the current object of interest to a new object of interest and, if so, panning or zooming to the new object of interest and making the new object of interest the current object of interest; and determining whether a user's gaze is directed beyond the current object of interest but not to a new object of interest and, if so, zooming to default zoom level in which there is no current object of interest.

Determining whether the user's gaze is directed beyond the current object of interest may include determining whether the user's gaze has been beyond of the current object of interest for more than a gaze duration threshold.

The method may further comprise determining whether the new object of interest is similar to the current object of interest, wherein: if the new object of interest is similar to the current object of interest, presenting the new object of interest includes panning to the new object of interest; and/or if the new object of interest is not similar to the current object of interest, presenting the new object of interest includes zooming to the new object of interest.

Zooming to the new object of interest may involve zooming in or zooming out.

In some examples, changing between zoom levels is implemented gradually.

Zooming to the new object of interest may involve setting a zoom level such that the new object of interest fills the display with a defined border.

In a third aspect, this specification describes an apparatus configured to perform any method as described with reference to the second aspect.

In a fourth aspect, this specification describes a computer readable medium comprising program instructions stored thereon for performing at least the following: presenting a current image on a display, the current image having a current zoom level directed towards a current object of interest; determining whether a user's gaze is directed beyond the current object of interest to a new object of interest and, if so, panning or zooming to the new object of interest and making the new object of interest the current object of interest; and determining whether a user's gaze is directed beyond the current object of interest but not to a new object of interest and, if so, zooming to default zoom level in which there is no current object of interest.

In a fifth aspect, this specification describes a non-transitory computer-readable medium comprising program instructions stored thereon for performing at least the following: presenting a current image on a display, the current image having a current zoom level directed towards a current object of interest; determining whether a user's gaze is directed beyond the current object of interest to a new object of interest and, if so, panning or zooming to the new object of interest and making the new object of interest the current object of interest; and determining whether a user's gaze is directed beyond the current object of interest but not to a new object of interest and, if so, zooming to default zoom level in which there is no current object of interest.

In a sixth aspect, this specification describes an apparatus comprising: at least one processor; and at least one memory including computer program code which, when executed by the at least one processor, causes the apparatus to: present a current image on a display, the current image having a current zoom level directed towards a current object of interest; determine whether a user's gaze is directed beyond the current object of interest to a new object of interest and, if so, panning or zooming to the new object of interest and making the new object of interest the current object of interest; and determine whether a user's gaze is directed beyond the current object of interest but not to a new object of interest and, if so, zooming to default zoom level in which there is no current object of interest.

BRIEF DESCRIPTION OF THE DRAWINGS

Example embodiments will now be described, by way of non-limiting examples, with reference to the following schematic drawings, in which.

DETAILED DESCRIPTION

Figure 1:
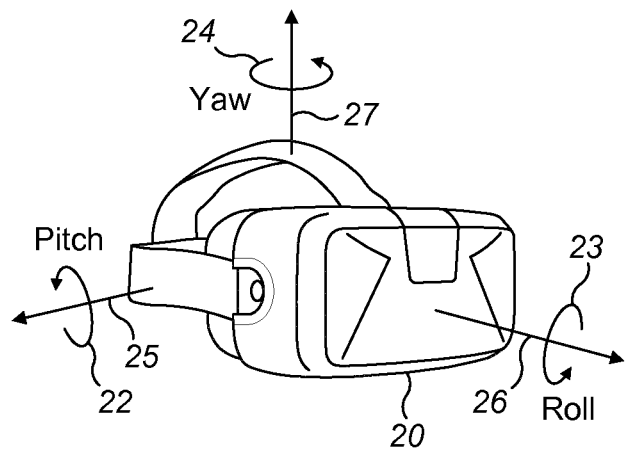
FIG. 1 shows a virtual reality or augmented reality headset.

FIG. 1 shows a virtual reality or augmented reality headset 20, for displaying visual data for a virtual reality or augmented reality space. The headset 20 may comprise augmented reality (AR) glasses, which may enable visual content, for example one or more virtual objects, to be projected or displayed on top of a see-through portion of the glasses.

The headset 20 receives the virtual reality or augmented reality content data, for example from a media player (not shown). Here, the media player may comprise a mobile phone, smartphone or tablet computer configured to play content through its display. For example, the media player may be a touchscreen device having a large display over a major surface of the device, through which video content can be displayed. The media player may be inserted into a holder of a headset 20. With such headsets 20, a smart phone or tablet computer may display visual data which is provided to a user's eyes via respective lenses in the headset 20. The visual data may be provided as a stereoscopic display where the two slightly different angles of the visual scene is displayed to each eye.

The headset 20 may include means for determining the spatial position of the user and/or orientation of the user's head. This may be by means of determining the spatial position and/or orientation of the headset 20. Over successive time frames, a measure of movement may therefore be calculated and stored. For example, the headset 20 may incorporate motion tracking sensors which may include one or more of gyroscopes, accelerometers and structured light systems. These sensors may generate position data from which a current visual field-of-view (FOV) is determined and updated as the user, and so the headset 20, changes position and/or orientation. The headset 20 may comprise two digital screens for displaying stereoscopic video images of the virtual world in front of respective eyes of the user, and also two speakers for delivering audio, if provided. The example embodiments herein are not limited to a particular type of headset 20.

In some example embodiments, the spatial position and/or orientation of the user's head may be determined using a six degrees of freedom (6DoF) method. As shown in FIG. 1, these include measurements of pitch 22, roll 23 and yaw 24 and also translational movement in Euclidean space along side-to-side, front-to-back and up-and-down axes 25, 26 and 27. (The use of a six-degrees of freedom headset is not essential. For example, a three-degrees of freedom headset could readily be used.)

The display system 20 may be configured to display virtual reality or augmented reality content data to the user based on spatial position and/or the orientation of the headset 20. A detected change in spatial position and/or orientation, i.e. a form of movement, may result in a corresponding change in the visual data to reflect a position or orientation transformation of the user with reference to the space into which the visual data is projected. This allows virtual reality content data to be consumed with the user experiencing a 3D virtual reality or augmented reality environment.

Figure 2:
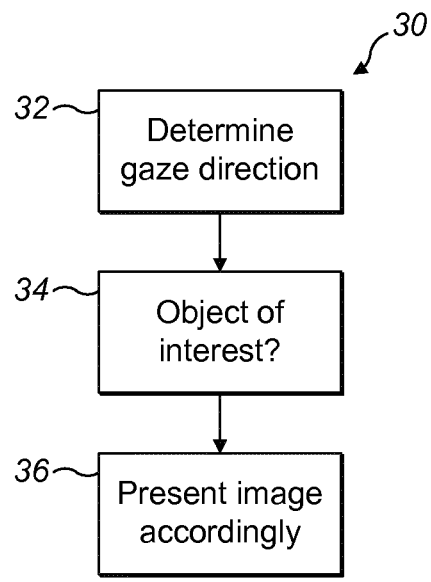
FIG. 2 is a flow chart showing an algorithm in accordance with an example embodiment.

FIG. 2 is a flow chart showing an algorithm, indicated generally by the reference numeral 30, in accordance with an example embodiment. The algorithm 30 starts at operation 32 where a gaze direction is determined. On the basis of the gaze direction, a determination is made in operation 34 regarding whether the user's gaze indicates that an object of interest is being viewed by the user. At operation 36, an image is presented to the user (for example using the headset 20), taking into account information regarding the gaze direction determined in operation 32 and an object of interest identified in operation 34.

FIGS. 3 to 9 show example output views in accordance with example embodiments. Each of the views is presented to a viewer indicated by the reference numeral 42.

Figure 3:
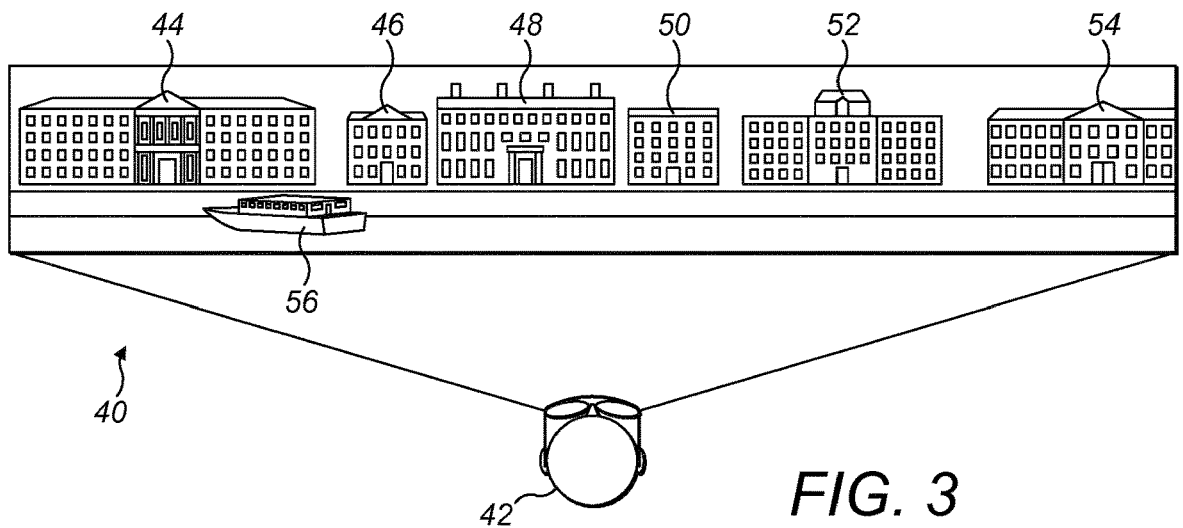
FIGS. 3 to 9 show example output views in accordance with example embodiments.

FIG. 3 shows a view, indicated generally by the reference numeral 40 in which the viewer 42 is presented with a view of a waterfront scene. The view 40 may, for example, be presented to the viewer using the headset 20 described above, but this is not essential.

The view 40 includes a first building 44, a second building 46, a third building 48, a fourth building 50, a fifth building 52, a sixth building 54 and a boat 56. In the view 40, the viewer 42 is not looking at anything specific and so no object of interest (operation 34 of the algorithm 30) is identified.

The headset 20 (or other display means) may have gaze tracking functionality, which is configured to detect a user gaze direction (operation 32) in order that an object of interest may be determined (operation 34). There are many known methods to accomplish this, some of which are discussed further below.

One method is to use video-based eye-trackers. A camera may focus on one or both eyes of the user and record eye movement as the user looks at some visual stimulus. Eye-trackers may use the centre of the pupil and infrared/near infra-red non-collimated light to create corneal reflections (CR). The vector between the pupil centre and the corneal reflections can be used to compute the point of regard on a surface or the gaze direction.

Other methods include eye-attached tracking, movement of the eye being detected with a special contact lens with an embedded mirror or magnetic field sensor. One method is to use electric potentials measured with electrodes placed around the eye.

A VR system may also contain head tracking capability in order to display a full 360 degrees and/or six degrees-of-freedom visual scene to the user. Head tracking means that when the user is wearing a VR headset (such as the headset 20) with head tracking capability, the visual scene displayed to the user's eyes reacts to the movement of the head. The head movement and/or direction of movement may be detected using, for example, a camera, gyroscope, accelerometer, magnetometer or a combination thereof.

Figure 4:
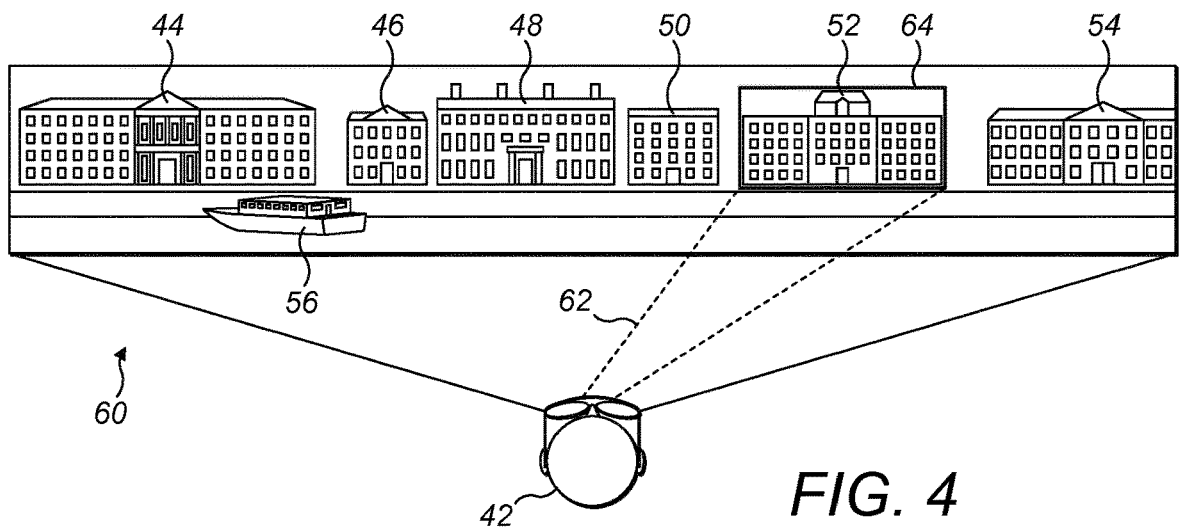

FIG. 4 shows a view, indicated generally by the reference numeral 60, in which the viewer is presented with the same view of the waterfront scene. A gaze direction 62 of the viewer 42 is indicated in the view 60. As shown in FIG. 4, the gaze direction 62 is towards the fifth building 52, such that the fifth building 52 has been identified (in operation 34 of the algorithm 30) as an object of interest to the viewer 42. The object of interest is highlighted by the reference numeral 64. Note that the object of interest may be defined only if the user's gaze remains within the gaze direction 62 for more than a gaze duration threshold time.

Figure 5:
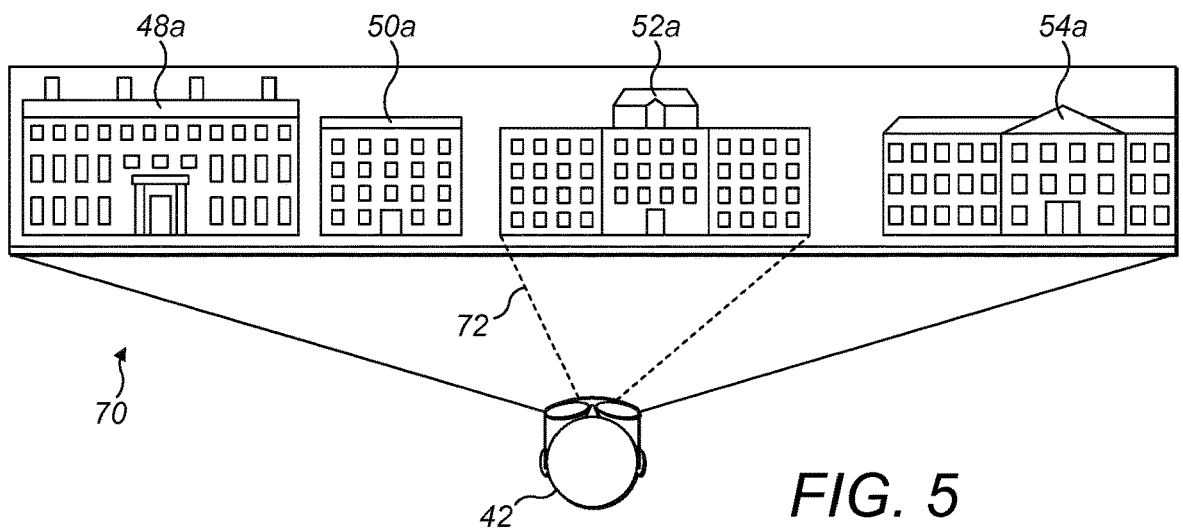

On identifying the object of interest 64, the user is presented with a modified view 70 that is focused on the object of interest (operation 36 of the algorithm 30), as shown in FIG. 5. The view 70 shows a zoomed version of the third building 48a, the fourth building 50a, the fifth building 52a and the sixth building 54a. The view 70 also shows 3 the gaze direction 72 of the viewer 42, which shows that the viewer's gaze is still directed towards the fifth building 52a, such that the fifth building remains the object of interest.

The zoom level and direction may be such that the object of interest (the fifth building 52a) fills the display, for example with a defined border. Such a display may be provided in order to enable the viewer to understand what is near to the object of interest (e.g. to understand the context of that object). In some circumstances, an increase in zoom level will be required (zooming in), but in other circumstances a reduction in zoom level will be required (zooming out). The object of interest may also be provided in the centre of the view 70.

If the gaze direction of the viewer 42 changes, then a new zooming level, directed towards a new object of interest may be defined. Consider, for example, the scenario in which the viewer, presented with the view 70, directs his/her gaze towards the third building 48a. This scenario in shown in FIG. 6, which shows a view, indicated generally by the reference numeral 80, showing a gaze direction 82 of the viewer 42 towards the third building 48a.

In response to detecting the new object of interest, a new view may be displayed in which a new zoom level appropriate for the third building is provided (for example, providing a view such that the third building fills the display with a small space around the building in the view).

Figure 6:
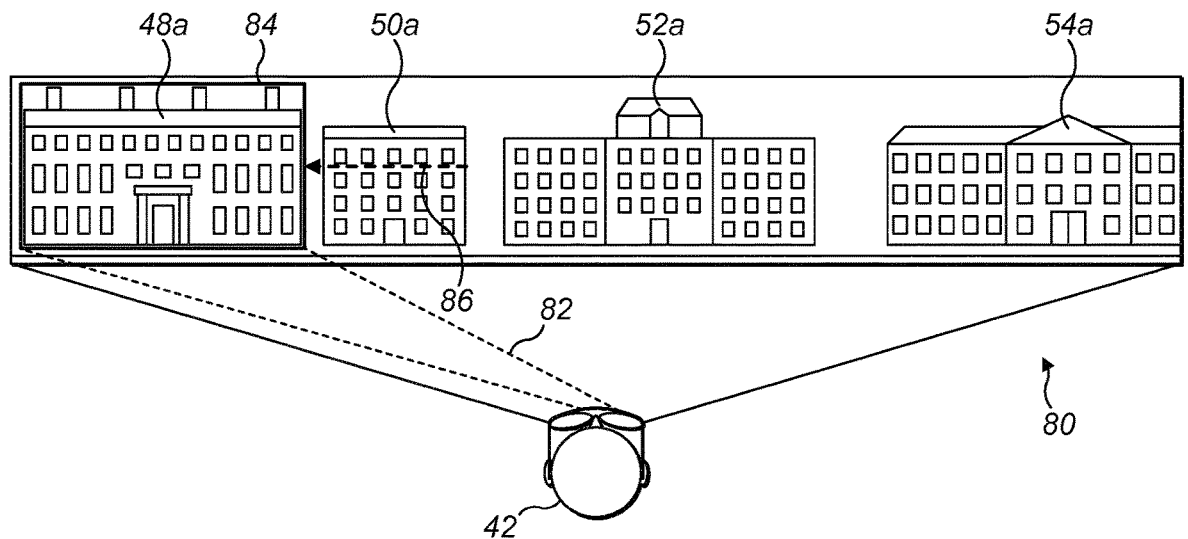

Alternatively, it may be detected that the fifth building 52a (the previous object of interest) and the third building 48a have similar sizes and so zooming is not necessary. Instead of a zooming operation, a panning operation may be performed. This is indicated in FIG. 6 by the arrow 86. The similar size may be defined, for example, as similar height, width, area, or a combination of thereof.

Figure 7:
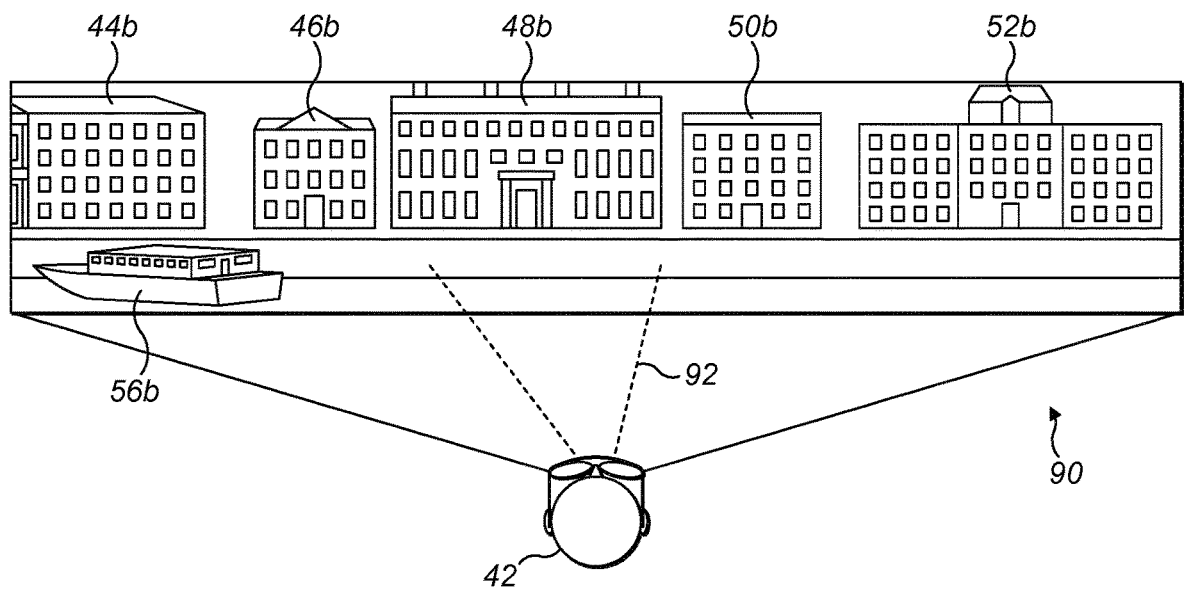

FIG. 7 shows a view, indicated generally by the reference numeral 90, in which the viewer is presented with a new view of the waterfront scene. The view 90 includes views of the first building 44b, the second building 46b, the third building 48b, the fourth building 50b, the fifth building 52b and the boat 56b. The gaze direction 92 of the viewer 42 is towards the third building 48b. The view 90 has the same zoom level as the view 80 described above, but has been panned such that the third building 48b (the object of interest) is within the centre of the view.

As described above, a panning operation may be carried out (rather than a zooming operation) in the event that a new object of interest has a similar size to a previous object of interest. This may lead to a more comfortable view for the viewer 42, since regular small changes in a zoom level caused by changes in gaze directions amongst similarly sized objects may be distracting.

In another example, panning (rather than zooming) may occur when a new object of interest has a similar (or the same) category to a previous object of interest. For example, if the gaze direction changes as the viewer 44 observes different buildings, the zoom level may be kept the same. Other examples of categories might include people, dogs and vehicles.

Figure 8:
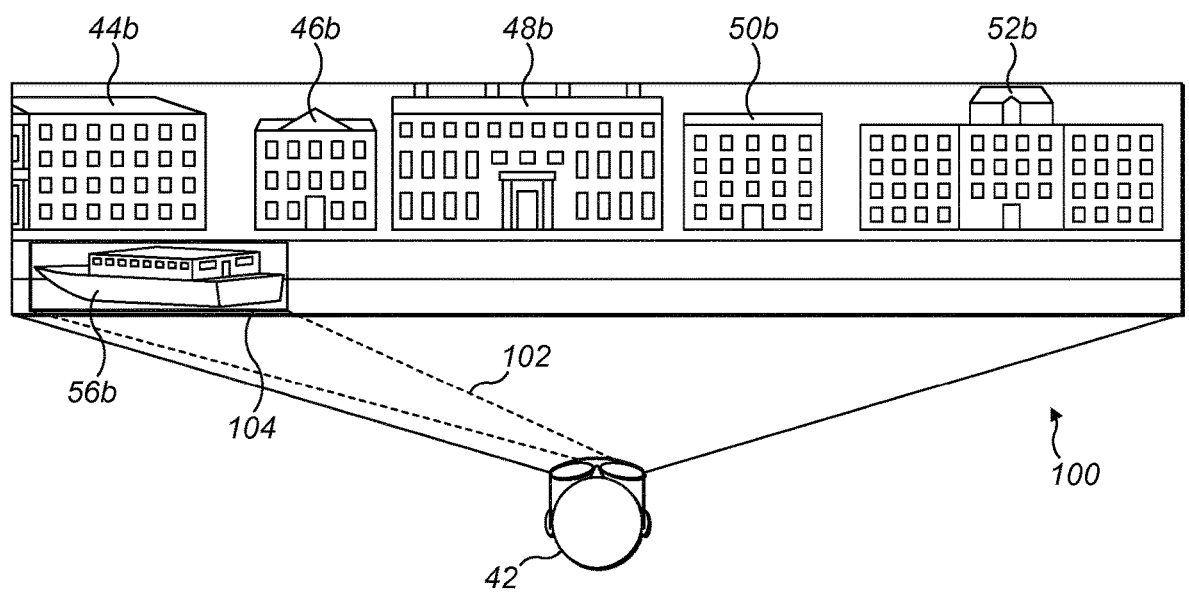

FIG. 8 shows a view, indicated generally by the reference numeral 100, in which the viewer is presented with a view of the waterfront scene having the same zoom level as the view 90 described above. Thus, the view 100 includes the first building 44b, the second building 46b, the third building 48b, the fourth building 50b, the fifth building 52b and the boat 56b described above. As shown in FIG. 8, the viewer 42 has a gaze direction 102 directed towards the boat 56b. The boat is clearly smaller than the previous object of interest (the third building 48b) and has a different category and so, on becoming the new object of interest, a new view at a new zoom level is provided.

Figure 9:
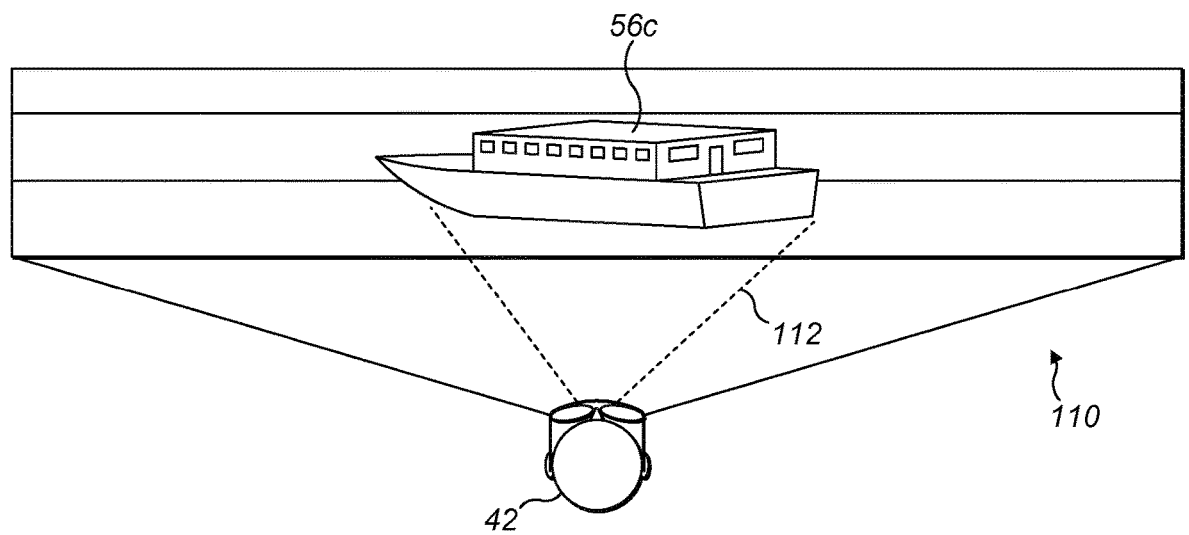

FIG. 9 shows a view, indicated generally by the reference numeral 110, in which the viewer is presented with a view of the waterfront scene centred on the boat 56c. The zoom level is set such that the boat 56c fills the screen with a small margin.

In the various embodiments described above, the zoom level may be chosen such that the target object is large enough for a user to get a clear understanding of the object and, at the same time, the surroundings are visible enough for a user to understand the context in which the object is located. For example, there could be 30% of the display capacity reserved on each side of the zoomed object. Thus, if the display has 1600×900 pixels, 240 pixels should be provided to the right and the left of the zoomed object and 135 pixels should be provided above and below the zoomed object as margin areas. The zoom level can therefore be chosen such that the zoomed object does not appear within the margin areas.

Figure 10:
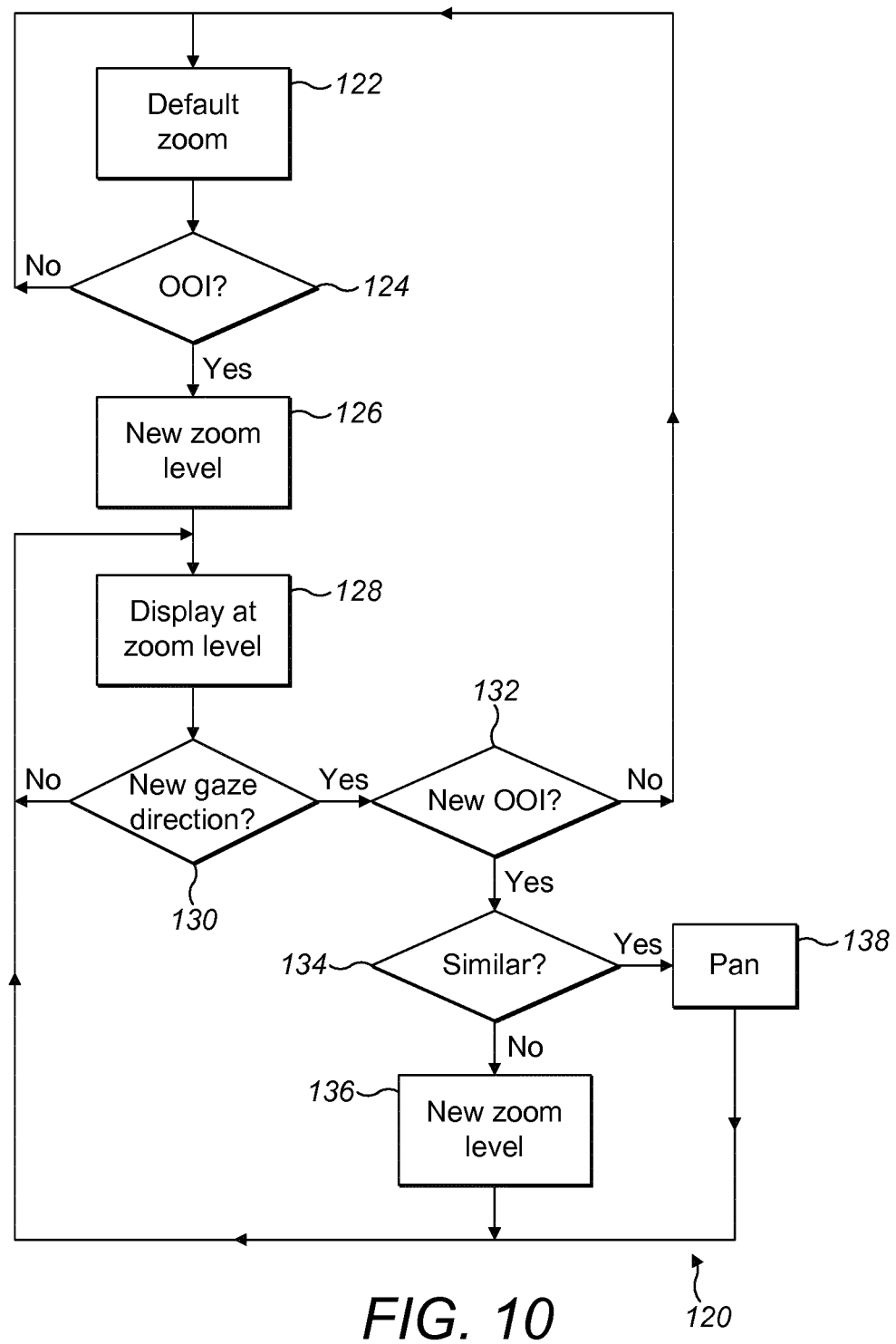
FIG. 10 is a flow chart showing an algorithm in accordance with an example embodiment.

FIG. 10 is a flow chart showing an algorithm, indicated generally by the reference numeral 120, in accordance with an example embodiment.

The algorithm 120 starts at operation 122, where a default zoom level is applied. By way of example, the view 40 described above may be at a default zoom level at which there is no object of interest.

At operation 124, it is determined whether an object of interest (OOI) is identified. If so, the algorithm moves to operation 126, otherwise the algorithm returns to operation 122 and a view having the default zoom is applied. Determining whether an object of interest is identified (operation 124) may include determining whether a gaze direction (such as the gaze direction 62) is towards a potential object of interest (such as the building 52) for more than a gaze duration threshold (such as 2 seconds, although other durations, which may be application dependent, are possible).

At operation 126, a new zoom level is set. The new zoom level is dependent on the object of interest identified at operation 124. As discussed above, the new zoom level may be set such that the object of interest fills the display with a predefined space around the object. The algorithm 120 then moves to operation 128 where the object of interest is displayed using the zoom level set in operation 126. The view displayed in operation 128 may, for example, be the view 70 described above with reference to FIG. 5 in which the zoom level is set (in operation 126) based on the fifth building 52a as the identified object of interest.

At operation 130, it is determined whether or not a new gaze direction is identified. If so, the algorithm moves to operation 132. If not, the algorithm 120 returns to operation 128 (such that the display is not changed). The operation 130 may involve a threshold duration (such as the gaze duration threshold) such that a change in gaze direction for a very short period of time does not result in a change in the display. The gaze duration threshold may be user-defined.

At operation 132, it is determined whether or not a new object of interest (OOI) has been identified. If not, it is determined that the viewer is not looking at any object and so the algorithm 120 returns to operation 122 such that the default zoom is applied (such that, for example, the view 40 is presented). If a new object of interest has been identified, the algorithm 120 moves from operation 132 to operation 134.

At operation 134, it is determined whether the new object of interest is similar to the previous object of interest. The new object may similar in terms of size, (such as height, width, area, or in combination thereof). The new object may be similar in terms of category. The examples of categories are buildings, dogs, vehicles, people etc. If the new object of interest is not similar, then the display zooms to the new object of interest (operation 136) before the algorithm returns to operation 128. A zoomed view of the new object of interest (such as the view 110 described above with reference to FIG. 9) can then be displayed. If the new object of interest is similar, then the display pans to the new object of interest (operation 138) before the algorithm returns to operation 128. A panned view (such as the view 90 described above with reference to FIG. 7) may be displayed.

The algorithm 120 includes a number of operations during which the zoom level of the view presented to a viewer is changed. Such changes of zoom level may be implemented gradually in order to provide a more pleasant experience for the viewer. The rate of change of zoom levels may be user-definable and/or application dependent.

In some embodiments, the size of an object of interest may change (either in real terms or relative terms). This may, for example, be because one of the viewer and the object of interest are moving. In such a scenario, it may be necessary to change a zoom level for viewing the object of interest. In common with the principles described above, the zoom level might only be changed if the size of the object changes by more than a threshold amount. The threshold may be user-defined.

If there are multiple overlapping potential objects of interest within the gaze direction of the viewer (e.g. a building and windows of the building), then a decision may be required regarding which object of interest to select. There may be many ways in which such a selection could be made. For example, the smallest potential object of interest may be selected as the object of interest. Alternatively, for example, the largest potential object of interest may be selected as the object of interest. Of course, there could be some threshold value to eliminate a brief change of gaze direction. The method described herein may include continuous object of interest identification or identify an object of interest only when a gaze direction is changed.

A selection of one of a number of possible objects of interest may be based on a user profile. For example, a user may have set a preference for what types of objects are searched from the content (such as building, vehicle, animals, people etc.). It is also possible that a user's preferred objects of interest are learned from user behaviour.

By way of example, consider a scenario in which a house is detected as an object of interest, but during zooming to the detected object of interest, the user's gaze remains within a window of the house. The window may now be detected as the object of interest and a further zoom be performed centred on that window. Similarly, in the event that a window of a building is detected as the object of interest, but during zooming to the window, the gaze of the user extends beyond the window, perhaps to different windows within the building, the building may be identified as the object of interest and the zooming arrangement adjusted accordingly.

The embodiments described above include still images presented to a viewer. This is not essential. For example, video images could be presented.

Figure 11:
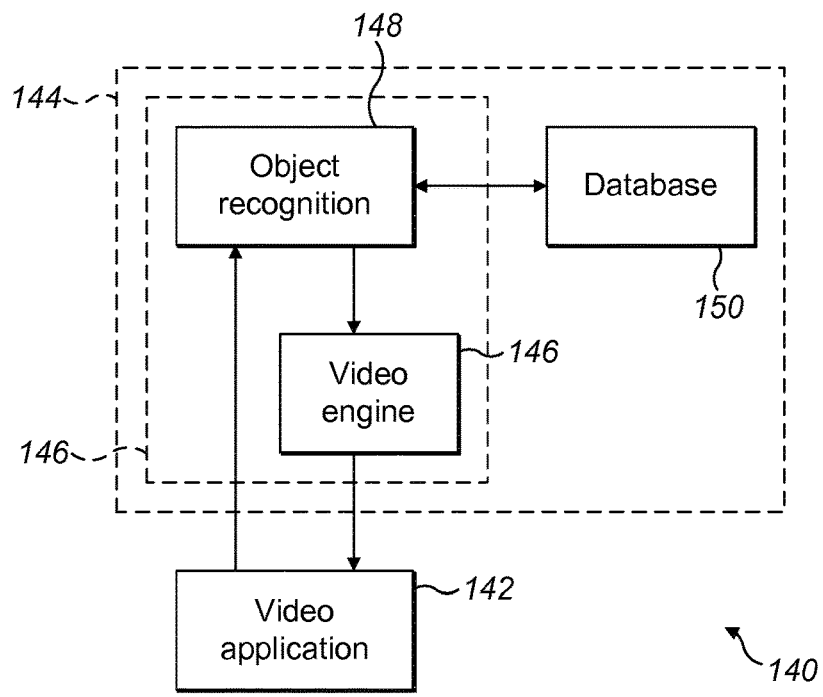
FIG. 11 is a block diagram of a system in accordance with an example embodiment.

FIG. 11 is a block diagram of a system, indicated generally by the reference numeral 140, in accordance with an example embodiment. The system 140 comprises a video application 142 and a server 144. The video application 142 may be provided to enable images to be presented to a user (for example using the headset 20 described above).

The server 144 includes a processor 145 and a memory including a database 150. The processor 145 includes a video engine 146 for providing data for presentation by the video application 142 and an object recognition module 148 for receiving data from the video application 142. The object recognition module 148 is in two-way communication with the database 150. The database 150 may contain data for identifying different object categories.

The system 140 may be used to implement the algorithm 120 described above. Thus, the video engine 146 may provide video data (either still or moving images) at the appropriate zoom level and directed to a current object of interest (if any) for presentation to the viewer (for example using the headset 20). User input, such as gaze direction data may be provided from the video application 142 to the object recognition module 148. The object recognition module 148 may determine whether the user's gaze is directed towards an object of interest. Furthermore, by consulting the database 150, the object recognition module 148 may be able to determine a category of an object of interest for use, for example, in determining whether the category of a new object of interest is the same as the category of a previous object of interest. Alternatively, or in addition, the object recognition module 148 may be able to determine the size of an object of interest.

Figure 12:
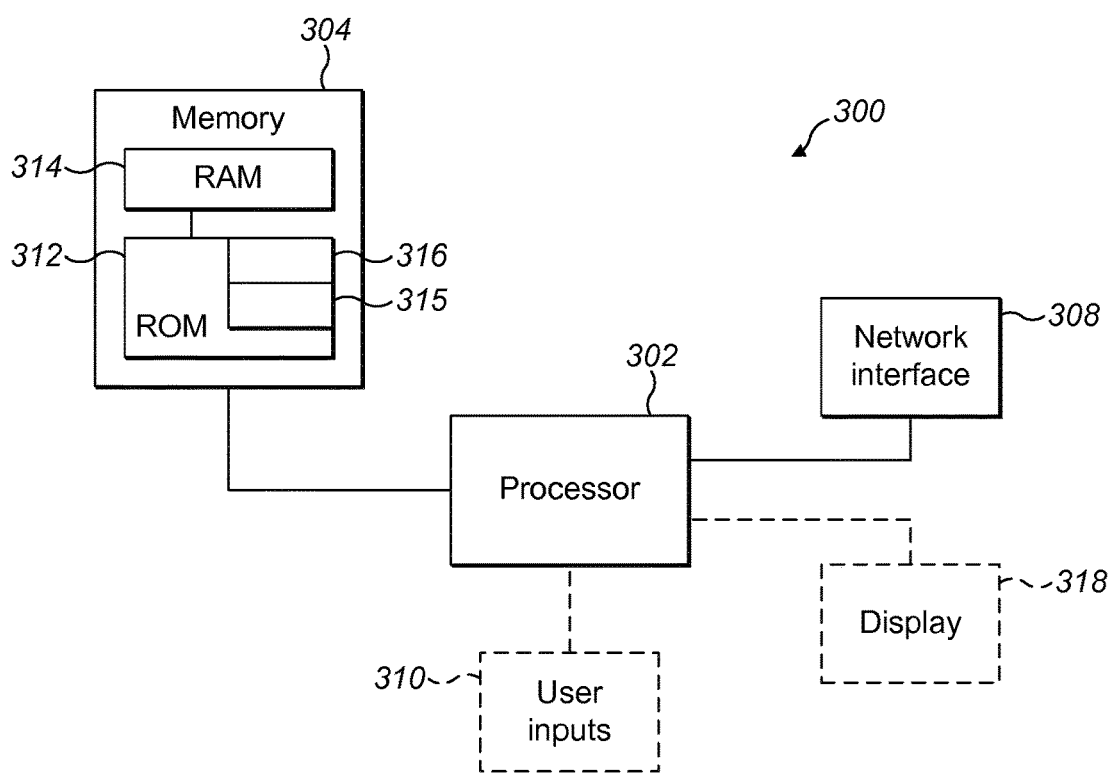
FIG. 12 is a block diagram of a system in accordance with an example embodiment.

For completeness, FIG. 12 is a schematic diagram of components of one or more of the modules described previously (e.g. the control module video application 142 and/or the server 144), which hereafter are referred to generically as processing systems 300. A processing system 300 may have a processor 302, a memory 304 coupled to the processor and comprised of a RAM 314 and ROM 312, and, optionally, user inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms 30 or 120.

The processor 302 may take any suitable form. For instance, it may be a microcontroller, plural microcontrollers, a processor, or plural processors.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 13A:
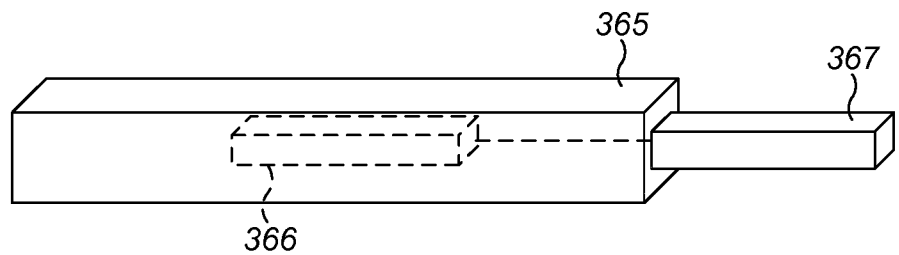
FIGS. 13a and 13b show tangible media, respectively a removable memory unit and a compact disc (CD) storing computer-readable code which when run by a computer perform operations according to embodiments.
Figure 13B:
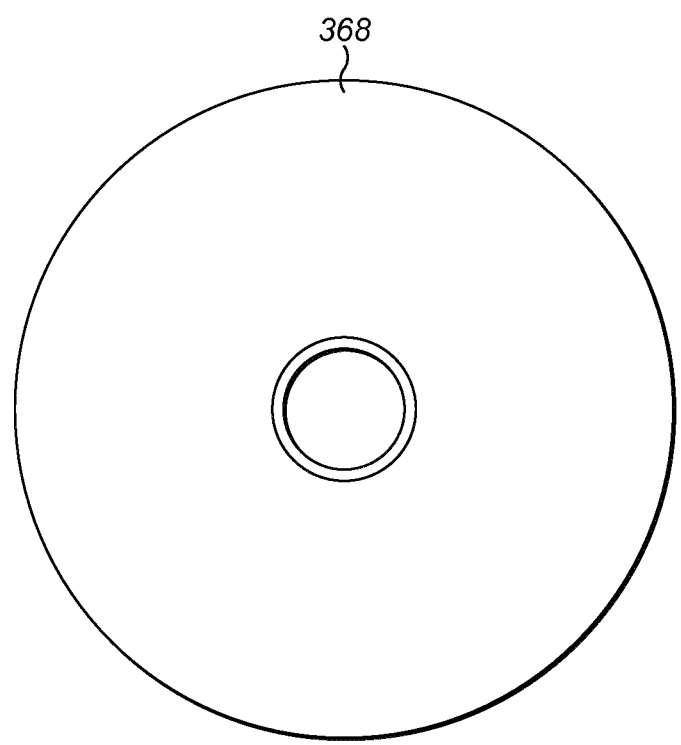

FIG. 13*a* and FIG. 13*b* show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2 and 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and at least one memory including computer program code;
the at least one memory and the computer program code configured to, with the at least one processor, cause the apparatus at least to perform:
presenting a current image on a display, the current image having a current zoom level directed towards a current object of interest;
determining whether a user's gaze is directed beyond the current object of interest to a new object of interest and, if so, panning or zooming to the new object of interest and making the new object of interest the current object of interest;
determining whether a user's gaze is directed beyond the current object of interest but not to a new object of interest and, if so, changing a zoom level to a default zoom level in which there is no current object of interest;
determining at least one of (a) whether a difference in size between the current and new objects of interest fails to satisfy a threshold, or (b) a category of said current and new objects of interest, and if at least one of (a) the difference in the size between the current and new objects of interest fails to satisfy the threshold, or (b) said categories are the same, determining that the new object of interest is similar to the current object of interest and if not, determining that the new object of interest is determined to not be similar to the current object of interest;
panning to the new object of interest if the new object of interest is determined to be similar to the current object of interest; and
zooming to the new object of interest if the new object of interest is determined to not be similar to the current object of interest.

2. The apparatus as claimed in claim 1, wherein the at least one memory and the computer program code are further configured to, with the at least one processor, cause the apparatus to perform:
determining whether the user's gaze is directed beyond the current object of interest includes determining whether the user's gaze has been beyond of the current object of interest for more than a gaze duration threshold.

3. The apparatus as claimed in claim 1, wherein the at least one memory and the computer program code are further configured to, with the at least one processor, cause the apparatus to perform:
determining, in the event that there is no current object of interest, whether a user's gaze is directed towards an object of interest and, if so, presenting an initial image on the display, the initial image having a first zoom level directed towards the said object of interest.

4. The apparatus as claimed in claim 1, wherein the current image is a video image or a still image.

5. The apparatus as claimed in claim 1, wherein the display is a virtual reality, mixed reality or augmented reality display.

6. A method comprising:
presenting a current image on a display, the current image having a current zoom level directed towards a current object of interest;
determining whether a user's gaze is directed beyond the current object of interest to a new object of interest and, if so, panning or zooming to the new object of interest and making the new object of interest the current object of interest;
determining whether a user's gaze is directed beyond the current object of interest but not to a new object of interest and, if so, changing a zoom level to a default zoom level in which there is no current object of interest;
determining at least one of (a) whether a difference in size between the current and new objects of interest fails to satisfy a threshold, or (b) a category of said current and new objects of interest, and if at least one of (a) the difference in the size between the current and new objects of interest fails to satisfy the threshold, or (b) said categories are the same, determining that the new object of interest is similar to the current object of interest, and if not, determining that the new object of interest is determined to not be similar to the current object of interest;
if the new object of interest is similar to the current object of interest, presenting the new object of interest including panning to the new object of interest; and
if the new object of interest is not similar to the current object of interest, presenting the new object of interest including zooming to the new object of interest.

7. The method as claimed in claim 6, wherein determining whether the user's gaze 1 s directed beyond the current object of interest includes determining whether the user's gaze has been beyond of the current object of interest for more than a gaze duration threshold.

8. The method as claimed in claim 6, wherein zooming to the new object of interest involves zooming in or zooming out.

9. The method as claimed in claim 6, wherein changing between zoom levels is implemented gradually.

10. The method as claimed in claim 6, wherein zooming to the new object of interest involves setting a zoom level such that the new object of interest fills the display with a defined border.

11. A non-transitory computer readable medium comprising program instructions stored thereon for performing at least the following:
presenting a current image on a display, the current image having a current zoom level directed towards a current object of interest;
determining whether a user's gaze is directed beyond the current object of interest to a new object of interest and, if so, panning or zooming to the new object of interest and making the new object of interest the current object of interest;
determining whether a user's gaze is directed beyond the current object of interest but not to a new object of interest and, if so, changing a zoom level to a default zoom level in which there is no current object of interest;
determining at least one of (a) whether a difference in size between the current and new objects of interest fails to satisfy a threshold or (b) a category of said current and new objects of interest, and if at least one of (a) the difference in the size between the current and new objects of interest fails to satisfy the threshold, or (b) said categories are the same, determining that the new object of interest is similar to the current object of interest and if not, determining that the new object of interest is determined to not be similar to the current object of interest;
if the new object of interest is similar to the current object of interest, presenting the new object of interest including panning to the new object of interest; and if the new object of interest is not similar to the current object of interest, presenting the new object of interest including zooming to the new object of interest.

\* \* \* \* \*

UNITED STATES PATENT AND TRADEMARK OFFICE
CERTIFICATE OF CORRECTION

PATENT NO. : 11,287,881 B2
APPLICATION NO. : 16/982825
DATED : March 29, 2022
INVENTOR(S) : Ari-Pekka Liljeroos et al.

Page 1 of 1

It is certified that error appears in the above-identified patent and that said Letters Patent is hereby corrected as shown below:

In the Claims

In Column 12, Line 25, Claim 7, delete "1 s" and insert -- is --, therefor.

Signed and Sealed this
Twenty-eighth Day of February, 2023

Katherine Kelly Vidal
*Director of the United States Patent and Trademark Office*